(12) United States Patent
Grimmel

(10) Patent No.: US 6,530,716 B2
(45) Date of Patent: Mar. 11, 2003

(54) DETACHABLE CONNECTION OF CYLINDRICAL HOLLOW SHAFTS

(75) Inventor: Rüdiger Grimmel, Netphen (DE)

(73) Assignee: SMS Demag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/931,383

(22) Filed: Aug. 16, 2001

(65) Prior Publication Data
US 2002/0044822 A1 Apr. 18, 2002

(30) Foreign Application Priority Data
Aug. 16, 2000 (DE) .......................... 100 39 873

(51) Int. Cl.[7] .................. F16B 21/00; F16D 1/00; F16L 37/00; F16L 23/00
(52) U.S. Cl. ................ 403/322.3; 403/11; 403/335; 285/18; 285/309; 285/366
(58) Field of Search ................ 74/416, 417, 423, 74/420, 89, 89.23, 89.28; 403/11, 12, 33, 362, 335, 336, 322.3; 285/18, 305, 307, 308, 309, 405, 363, 366

(56) References Cited

U.S. PATENT DOCUMENTS

| | | | | |
|---|---|---|---|---|
| 3,662,087 A | * | 5/1972 | Singletary | 174/65 R |
| 4,052,091 A | * | 10/1977 | Bowden | 285/305 |
| 4,074,923 A | * | 2/1978 | Howe, Jr. | 384/541 |
| 4,274,640 A | * | 6/1981 | Cook | 277/608 |
| 4,402,533 A | * | 9/1983 | Ortloff | 285/18 |
| 5,050,691 A | * | 9/1991 | Moses | 175/57 |
| 5,333,911 A | * | 8/1994 | Watkins | 285/18 |

* cited by examiner

Primary Examiner—Anthony Knight
Assistant Examiner—Michael J. Kyle
(74) Attorney, Agent, or Firm—Friedrich Kueffner

(57) ABSTRACT

A detachable connection of first and second hollow shafts having first and second end faces is provided by axially insetting the first and second end faces into one another, wherein the first end face has an inner annular flange and the second end face has an outer annular flange. The annular flanges overlap one another when inserted. The inner annular flange has several radially displaceable locking bolts. The locking bolts have first locking bolt ends facing the outer annular flange and second locking bolt ends threadedly guided in the inner annular flange. The outer annular flange has locking bushings for the locking bolts. The locking bolts have a central circumferential pinion having teeth. The inner annular flange has a rotary ring with lateral teeth meshing with the circumferential pinions. The first locking bolt ends have receptacles for a rotary tool for rotating the locking bolts about the bolt axis.

2 Claims, 3 Drawing Sheets

DETACHABLE CONNECTION OF CYLINDRICAL HOLLOW SHAFTS

BACKGROUND OF THE INVENTION

1. Field of the Invention

The invention relates to a detachable connection of cylindrical hollow shafts whose end faces have annular flanges which are inserted into one another in an overlapping way in the direction of the hollow shaft axes.

2. Description of the Related Art

Connections of this kind are comprised generally of screw or clamping connections inserted into the overlapping annular flanges. The decisive disadvantage of such connecting types is that the insertion of the corresponding screw or clamping elements requires a considerable manual expenditure and, depending on the arrangement and quality of the connection, also requires a corresponding experience. Moreover, depending on the configuration conditions, the overlapping annular flanges are not easily accessible about their circumference for carrying out such labor.

SUMMARY OF THE INVENTION

It is an object of the present invention to provide a connection of the aforementioned kind which can be easily produced and simply detached and does not require special experience of the operating personnel, while it also does not require unimpeded access about the entire circumference of the annular flanges to be connected.

In accordance with the present invention, this is achieved in that in the inner annular flange of the two annular flanges two or more locking bolts are radially displaceably arranged and in that locking bushings, open at both ends and correlated with the respective locking bolt ends of the locking bolts that they receive, are correlated therewith in the outer annular flange, and in that the other end of the locking bolts is guided threadedly in the inner annular flange and the locking bolt, between its two ends is provided with a circumferential pinion whose teeth mesh like a crown gear with the teeth of a rotary ring rotationally supported in the inner annular flange and provided with lateral teeth, wherein the outwardly facing end faces of the locking bolt ends of the locking bolts have receptacles for insertion of rotary tools for rotating the locking bolts about their longitudinal axis.

With this solution, all locking bolts can be simultaneously actuated, i.e., brought into the locking position or release position, by means of the rotary ring that engages the circumferential pinions of all locking bolts by inserting the tool into one of the locking bolts and rotating it; even locking bolts which in the past have been difficult to access can be actuated in this way.

The solution according to the invention is suitable also for use in laying heads for wire rod which is supplied by a wire rolling mill, wherein the laying head is comprised of a rotatingly driven hollow shaft and a cylindrically or conically shaped pipe holder detachably coupled at the end face to the hollow shaft in which the wire rod by means of a spirally formed laying pipe arranged therein is formed successively to wire windings, wherein the hollow shaft and the pipe holder have annular flanges overlapping one another, and wherein the locking bolts and the rotary ring meshing with their circumferential pinions are arranged in the annular flange of the hollow shaft and the locking bushings are arranged in the annular flange of the pipe holder.

Since in this type of laying head the pipe holder supporting the laying pipe, in particular, because of the wear caused in the laying pipe as a result of the high velocity of the wire rod guided therethrough, must be exchanged frequently for the purpose of exchanging the laying pipe, the possibility according to the invention of effecting or detaching the connection between the hollow shaft and the pipe holder by means of a single tool which, when inserted into one of the locking bolts, can move all locking bolts into or out of the locking position, leads to the advantage, in addition to the already mentioned advantages, that the operation of the wire rolling mill must not be interrupted, or interrupted only for a short period of time, for this purpose.

DESCRIPTION OF THE PREFERRED EMBODIMENTS

Figure 1:
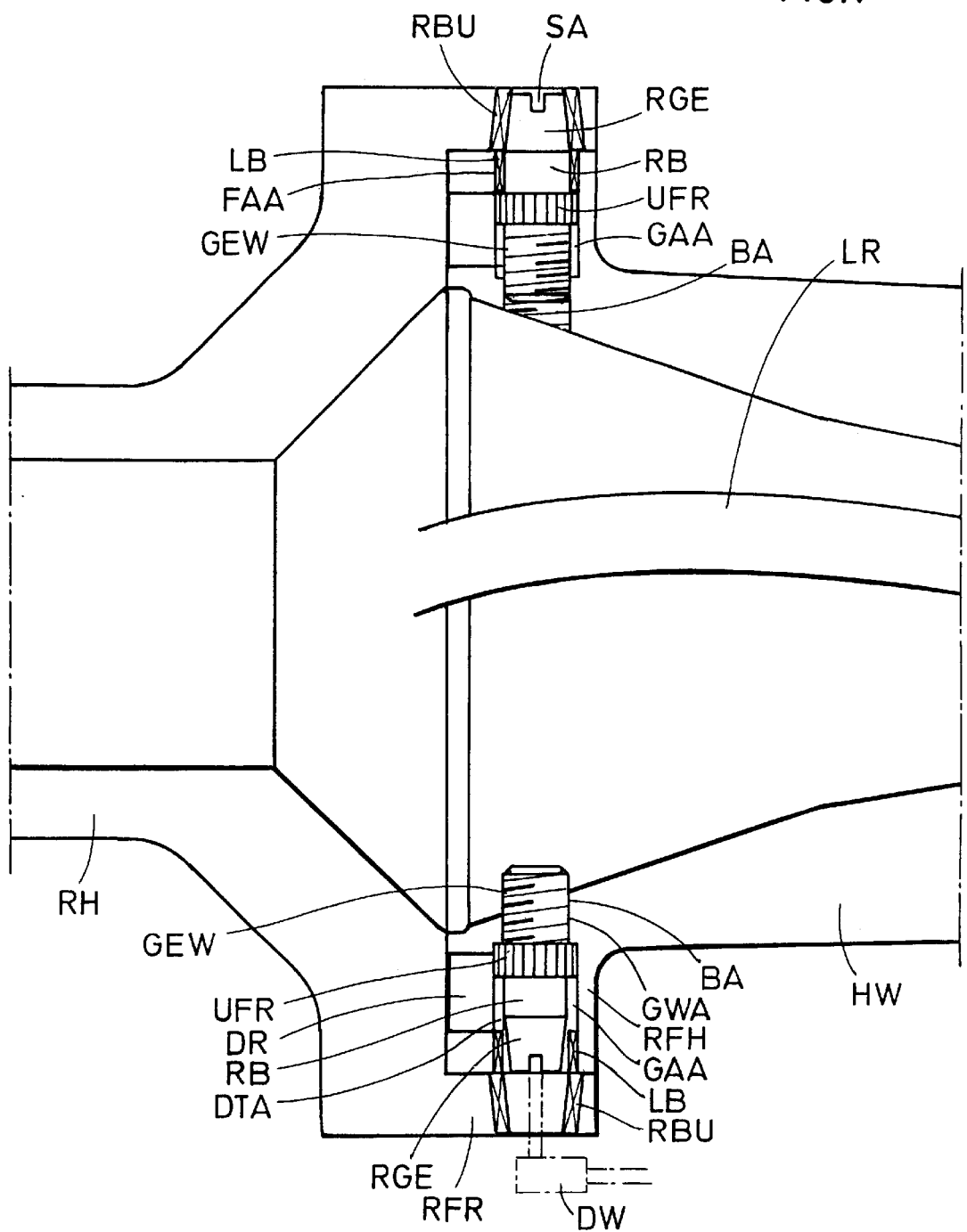
FIG. 1 is an axial section of a portion of the coupling of the hollow shaft and the pipe holder of a laying head.

As can be seen in FIG. 1, a hollow shaft HW has an annular flange RFH, here shown as an inner annular flange, which is inserted with overlap into the outer annular flange RFR of a pipe holder RH supporting the laying pipe LR. In the annular flange RFH of the hollow shaft HW radially extending cylindrical bore recesses BA are arranged (see also FIGS. 2 and 3) which have radially inwardly a threaded portion GWA, adjacent thereto a smooth cylinder portion GAA, and adjoining the latter a guide portion FAA which is also smooth-walled. Moreover, in this annular flange RFH a rotary ring DR is provided which is rotationally supported and guided about the center axis of the hollow shaft HW, wherein the rotary ring DR is provided with a toothing oriented toward the bore recesses BA. The wall of the smooth-cylindrical portion of the portion GAA of the bore recesses BA has in the area of this toothing of the rotary ring DR a corresponding penetration DTA. In the mouth area within the guide portion FAA of the bore recess BA a cylindrical bearing bushing LB is inserted.

A locking bolt RB is inserted into the bore recess BA, wherein the locking bolt RB has an outwardly oriented locking bolt end RGE and an inwardly oriented threaded locking bolt end GEW, wherein between these ends a middle section having arranged thereat a circumferential pinion is provided. The threaded end GEW is positioned in the threaded portion GWA of the bore recess BA and the locking bolt end RGE is positioned in front of the opening of a locking bushing RBU which is open at both ends, i.e., radially inwardly and radially outwardly, and is provided in the overlapping outer annular flange of the pipe holder RA. The toothing of the circumferential pinion UFR meshes through the penetration DTA of the bore recess BA with the toothing of the rotary ring DR. In the end face of the locking bolt end RGE of the locking bolt RB a receptacle SA for the insertion of a rotary tool DW, illustrated by a dash-dotted line, is provided.

Figure 2:
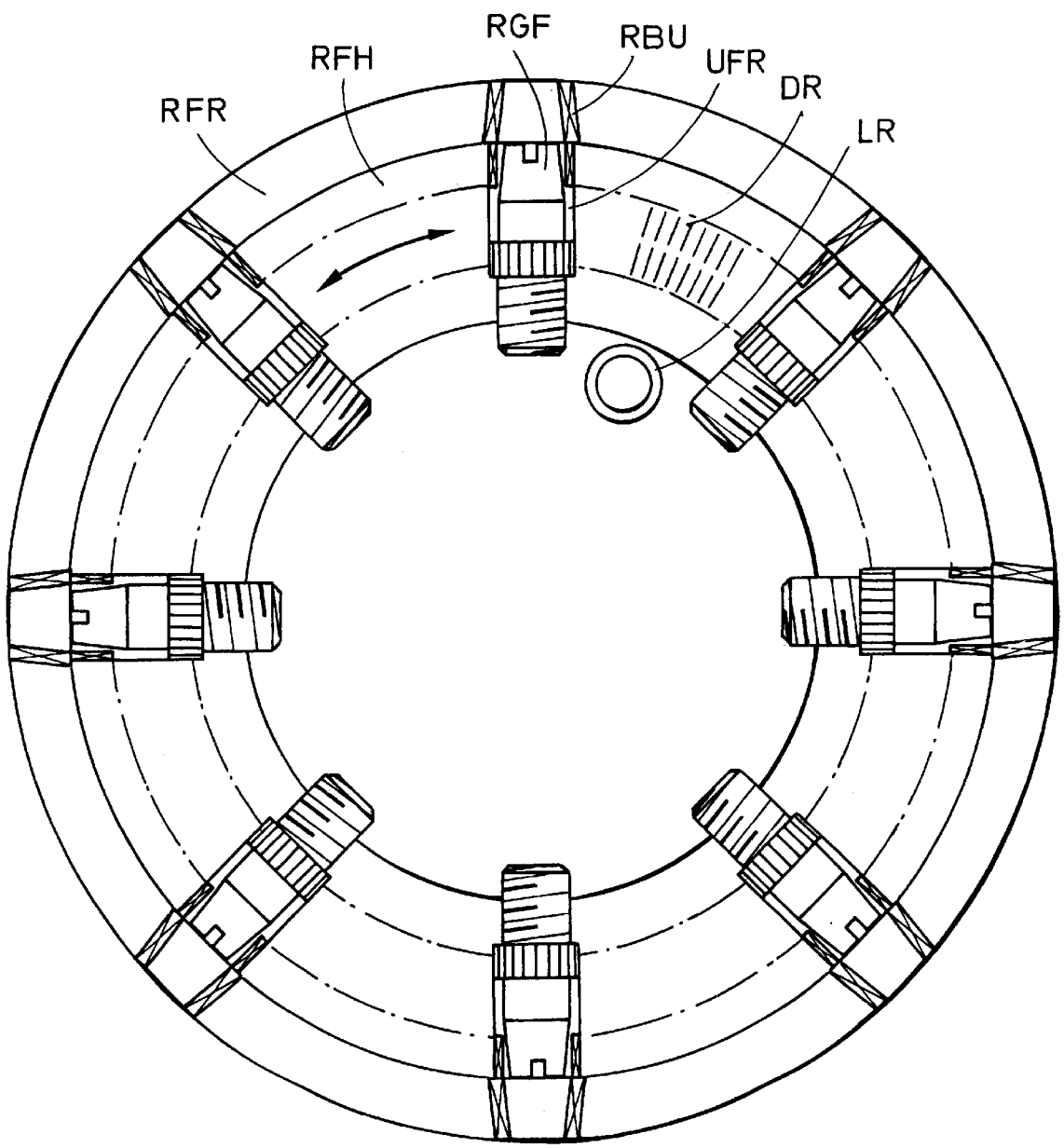
FIG. 2 is a section along line A—A of FIG. 1.
Figure 3:
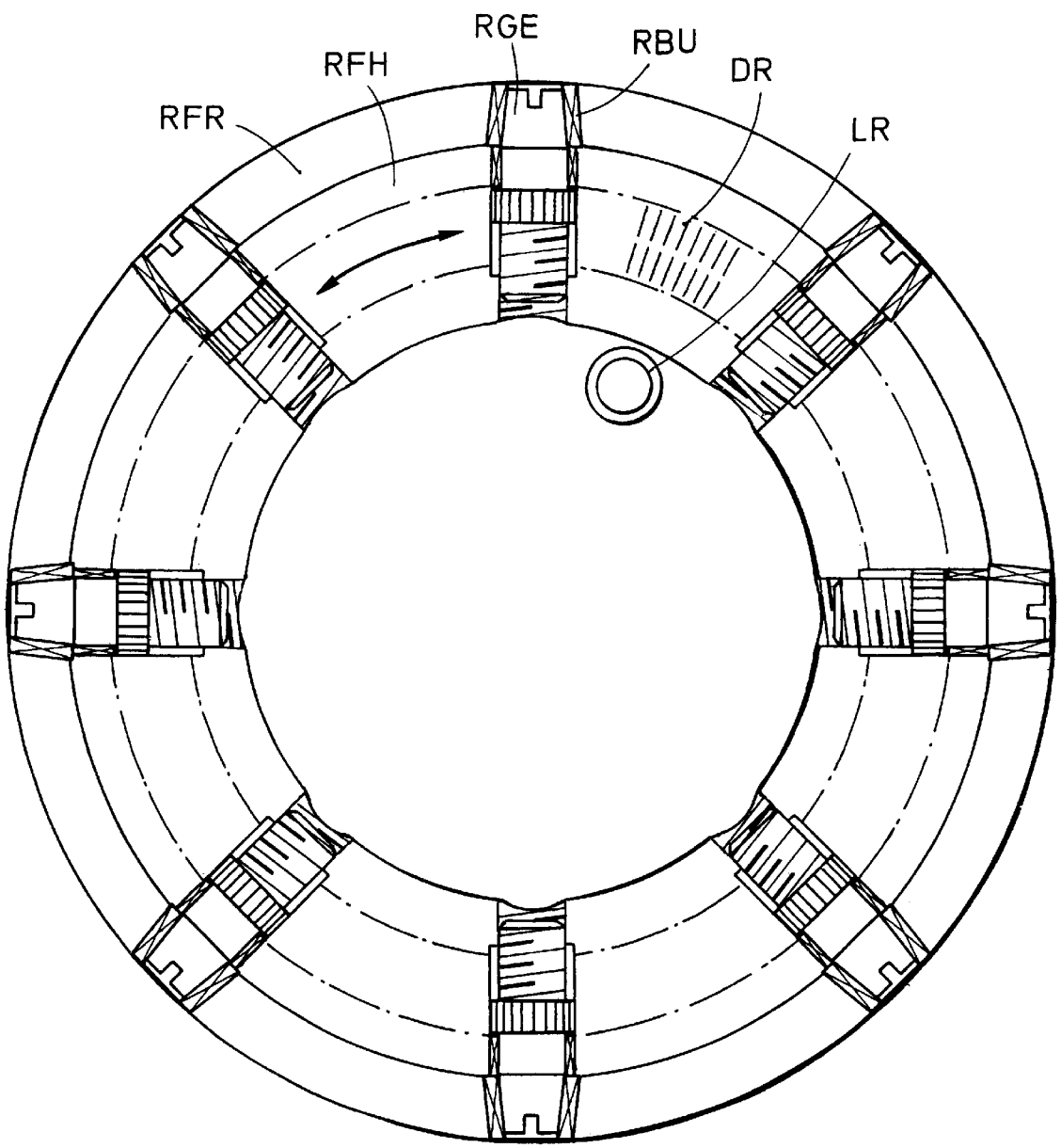
FIG. 3 is an illustration corresponding to that according to FIG. 2 in a different position of the coupling elements.

Coupling of the hollow shaft HW with the pipe holder RH is effected in that the rotary tool DW is inserted into the receptacle SA of the locking bolt end RGE, which is in the position illustrated at the bottom in FIG. 1 and also shown in FIG. 2. In this position, the locking bolt RB, by being rotated by means of the rotary tool and guided by the threaded connection of the threaded end GEW of the locking bolt RB with the threaded portion GWA of the bore recess BA, is moved axially radially outwardly until it reaches the position, illustrated in FIG. 1 at the top and also in FIG. 3, in which the locking bolt end RGE is positioned in the locking bushing RBU of the outer annular flange RFR of the pipe holder so that in this way the inner annular flange RFH of the hollow shaft is coupled with the outer annular flange RFR of the pipe holder.

The rotary movement of the locking bolt RB during this process is uniformly transmitted by means of the circumferential pinion UFR and by means of the simultaneous axial displacement made possible by the crown gear toothing onto the toothing of the rotary ring DR, and the rotary ring DR, in turn, moves all locking bolts RB, which are inserted into the inner annular flange RFH of the hollow shaft HW, by means of their respective circumferential pinions UFR so as to perform a corresponding rotational and locking movement. The release of the coupling connection is carried out analogously by actuation of the rotary tool DW in the reverse direction and radially inward movement of the locking bolts RB into the position illustrated in FIG. 3.

While specific embodiments of the invention have been shown and described in detail to illustrate the inventive principles, it will be understood that the invention may be embodied otherwise without departing from such principles.

What is claimed is:

1. A detachable connection of a first cylindrical hollow shaft having a first end face and a second cylindrical hollow shaft having a second end face, wherein the first end face is inserted into the second end face in an axial direction of the hollow shafts into an inserted position, wherein the first end face has an inner annular flange and the second end face has an outer annular flange and wherein the inner and outer annular flanges overlap one another in the inserted position, wherein the inner annular flange has two or more locking bolts radially displaceably arranged in the inner annular flange, wherein the locking bolts have first locking bolt ends facing the outer annular flange and second locking bolt ends threadedly guided in the inner annular flange, wherein the outer annular flange has locking bushings open at both ends and configured to receive the locking bolts, wherein the locking bushings are aligned with the locking bolts and face the first locking bolt ends, wherein the locking bolts have a middle section between the first and second locking bolt ends provided with a circumferential pinion having teeth, wherein the inner annular flange has a rotationally supported rotary ring with lateral teeth, wherein the teeth of the circumferential pinions and the lateral teeth of the rotary ring mesh with one another by crown gear meshing action, wherein the first locking bolt ends have outwardly facing end faces having receptacles configured to receive rotary tools for rotating the locking bolts about a longitudinal bolt axis.

2. The detachable connection according to claim 1, wherein the first hollow shaft is a rotatingly driven hollow shaft of a laying head for wire rod, supplied by a wire rolling mill, and wherein the second hollow shaft is a cylindrical or conical pipe holder detachably connected to the first end face of the driven hollow shaft, wherein the pipe holder has a spiral laying pipe configured to form successively arranged wire windings, wherein the locking bolts and the rotary ring are arranged on the driven hollow shaft.

* * * * *